United States Patent [19]

Hudalla

[11] 4,120,718

[45] Oct. 17, 1978

[54] APPLICATOR FOR HEAT-ACTIVATABLE TAPE

[75] Inventor: Mark G. Hudalla, Saint Paul, Minn.

[73] Assignee: Minnesota Mining and Manufacturing Company, St. Paul, Minn.

[21] Appl. No.: 770,182

[22] Filed: Feb. 18, 1977

Related U.S. Application Data

[62] Division of Ser. No. 615,774, Sep. 22, 1975, Pat. No. 4,019,948.

[51] Int. Cl.[2] .............................................. B32B 31/00

[52] U.S. Cl. .................................... 156/499; 156/322; 156/518

[58] Field of Search ............... 156/516, 517, 518, 521, 156/499, 380, 583, 320, 322; 53/379; 219/243; 118/120, 101; 427/356-358, 370

[56] References Cited

U.S. PATENT DOCUMENTS

| | | | |
|---|---|---|---|
| 2,590,128 | 3/1952 | Sandberg | 53/379 X |
| 2,675,838 | 4/1954 | Hickok et al. | 156/380 |
| 2,902,971 | 9/1959 | Roeder et al. | 118/120 X |
| 3,190,056 | 6/1965 | Ramaika et al. | 53/379 X |
| 3,200,028 | 8/1965 | Chisholm | 156/499 |
| 3,368,323 | 2/1968 | Wood | 156/499 X |
| 3,434,902 | 3/1969 | Bliss | 156/583 X |
| 3,773,597 | 11/1973 | Captain et al. | 156/499 |
| 3,873,400 | 3/1975 | Tsuchida et al. | 156/499 |

*Primary Examiner*—David A. Simmons

*Attorney, Agent, or Firm*—Cruzan Alexander; Donald M. Sell; John C. Barnes

[57] ABSTRACT

An applicator is disclosed for applying pieces of tape having a backing on one surface of which is a coating of a heat-activatable adhesive. The tape backing may be a fibrous tape as in hook and loop-fastening tape. The applicator utilizes an applicating pad having a surface which engages the backing opposite the adhesive surface. The pad supports the tape such that the same may be moved into contact with a heater and then moved to apply the tape to a receptor surface. The pad serves to uniformly affix the tape to the surface and force the backing and adhesive onto the surface to which the tape is to be applied. The tape may be applied to the pad and then cut to lengths or predetermined lengths of tape may be placed onto the brush.

1 Claim, 6 Drawing Figures

APPLICATOR FOR HEAT-ACTIVATABLE TAPE

RELATED APPLICATIONS

This application is a divisional application of Ser. No. 615,774, filed Sept. 22, 1975, and now U.S. Letters Pat. No. 4,019,948.

BACKGROUND OF THE INVENTION

1. Field of the Invention

This invention relates to an improved applicator for tape material having a heat-activatable adhesive and in one aspect to an improved device for activating the heat-activatable adhesive just prior to the application of cut lengths of tape to a receptor surface.

2. Description of the Prior Art

Dispensers for tape products and for applying discrete lengths of tape to articles are well known. Pressure-sensitive adhesive tape can be applied by advancing a section of the tape, cutting the section of tape and supporting the section of tape on a pad to advance the cut section of tape to an article to which it is to be applied. Examples of such dispensers are shown in U.S. Letters Pat. No. 3,472,724, issued Oct. 14, 1969 to J. H. Casey, and U.S. Letters Pat. No. 3,081,815 to J. W. Toensing, issued Mar. 19, 1963. Many other similar dispensers for pressure-sensitive tape are well known. In these devices however the cut section of tape is easily supported by vacuum since the backing for the tape is smooth and generally nonporous. A small amount of subatmospheric pressure will be sufficient to maintain the tape firmly against the pad during movement for application.

Dispensers are also known for dispensing lengths of a heat-activatable adhesive tape, by advancing the tape, cutting a discrete length from the strip of tape, preheating the adhesive on the tape to activate the same and applying the tape against a surface. Examples of such devices are known in the bookbinding art. One example is U.S. Letters Pat. No. 3,715,260 of P. L. Dornemann et al., issued Feb. 6, 1973. In this device a strip of tape is advanced from a supply roll, it is cut from the roll, a heater is passed over the adhesive in spaced relationship to activate the same by radiant heating, and then the edge of the sheets to be bound is moved into contact with the adhesive on the tape and forced thereagainst until the adhesive again cools. The tape utilized is a flexible sheet material capable of withstanding heat. The tape is also generally structured such that it can be supported or moved by a pneumatic member such as in the above-mentioned pressure-sensitive adhesive tape applicators. An example of an applicator for bookbinding tape using pneumatics is U.S. Letters Pat. No. 2,646,104 of T. B. Hawkes, issued July 21, 1953.

Conductive heating of heat-activatable adhesives by contacting the adhesive with the heating element is known, e.g., U.S. Letters Pat. No. 2,946,281, of A. O. Sohn, issued July 26, 1960, but ootaining rapid controlled heating by assuring brief intimate contact between the adhesive coating and the high temperature heater is not known.

Known systems which do not use pneumatics to support the tape are also known and one example is shown in U.S. Letters Pat. No. 3,625,799, of D. G. Way, issued Dec. 7, 1971. In this dispensing device the cut length of tape is retained on the applicating pad by means of anchoring pins which extend from the surface of the pad and perforate the cut section of tape. The anchoring pins move vertically out of their holding position when the face of the applicating pad comes into engagement with the surface to which the tape section is to be applied. This system does not fully support the strip of tape and the projecting pins would not allow the adhesive surface to be contacted other than with the article to which it is to be applied.

Therefore, the problem exists in being able to suitably support the cut length of tape having on one side of the tape backing a heat-activatable adhesive such that the adhesive surface could be moved past and into contact with a heating member to activate the adhesive to the desired depth without softening or deleteriously effecting the tape backing.

SUMMARY OF THE INVENTION

The present invention provides a tape applicator for a heat-activatable adhesive tape product. The applicator comprises a movable support pad for cut sections of the tape product and which will apply the cut section of tape under a unifrom pressure to a surface to which it is to be applied. The support pad is movable relative to a heater bar and movable between a tape receiving position and a tape applying position. The heater bar is sufficiently long that it can be moved transversely across the cut section of tape and contact the adhesive surface of the tape to activate the adhesive. The heater bar is urged toward the path of the tape on the support pad and is very hot so the depth of heat in the adhesive is controlled by the speed of the heater bar traversing the adhesive surface. The time required for contact between the heater bar and the adhesive is between about one-half second and one second to activate the adhesive. The pad is supported to move the tape into contact with a receptor surface on an article which may be an individual item or a continuous web of material. The support pad must apply a uniform pressure across the backing of the tape to hold the same in contact. This is essential with heat-activatable adhesive tapes where it is desired to hold the tape in contact with the article for a sufficient period of time such that the adhesive may cool and develop a strong bond between the tape and the article.

The tape may be fed to the applicating pad from a roll of tape and cut into the lengths or the tape may be supplied in precut sections for application to the support and/or applicating pad.

DESCRIPTION OF THE DRAWING

The present invention will be more fully described with reference to the accompanying drawing wherein.

DETAILED DESCRIPTION OF THE PREFERRED EMBODIMENT

Figure 1:
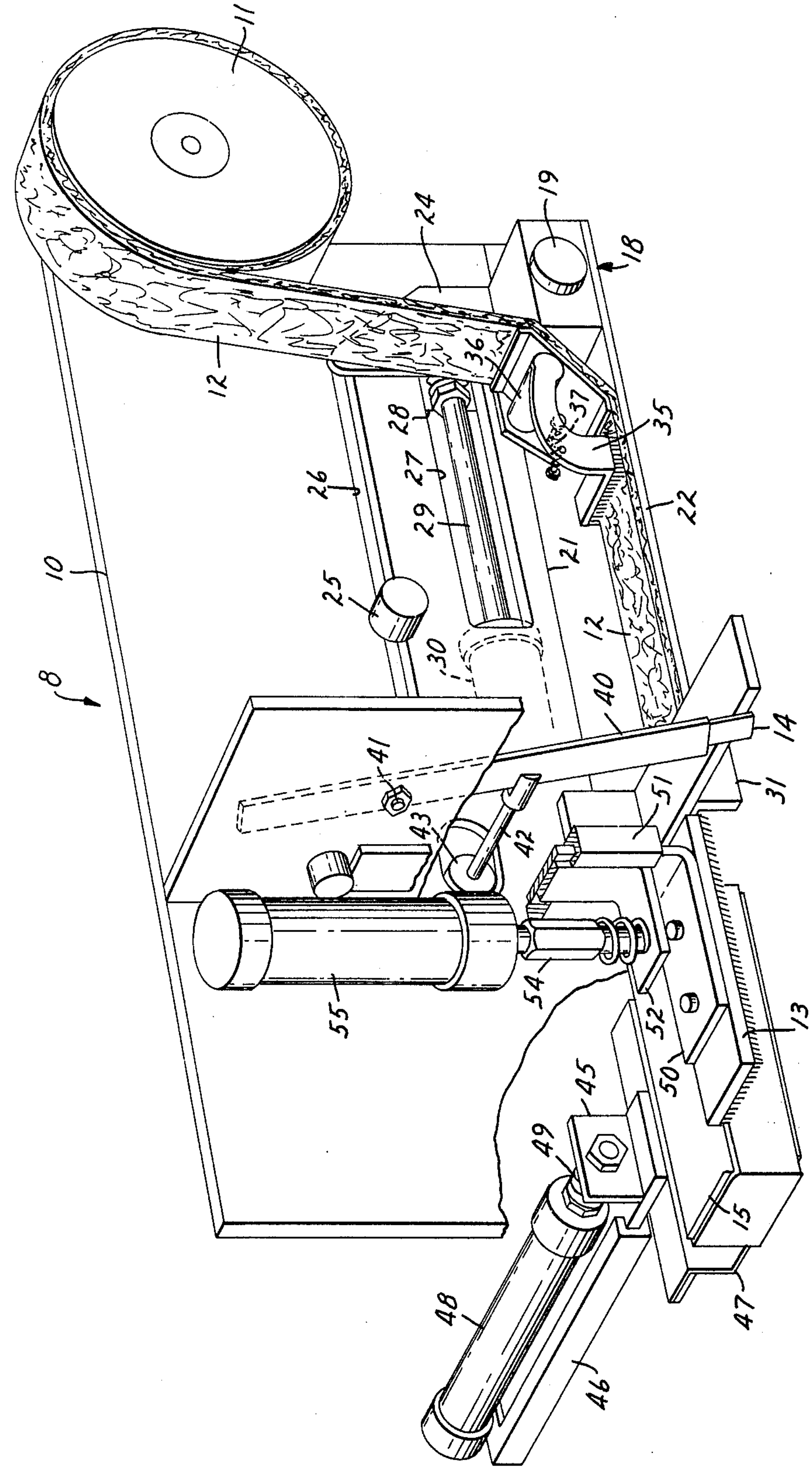
FIG. 1 is a perspective view of an applicator constructed according to the present invention.
Figure 2:
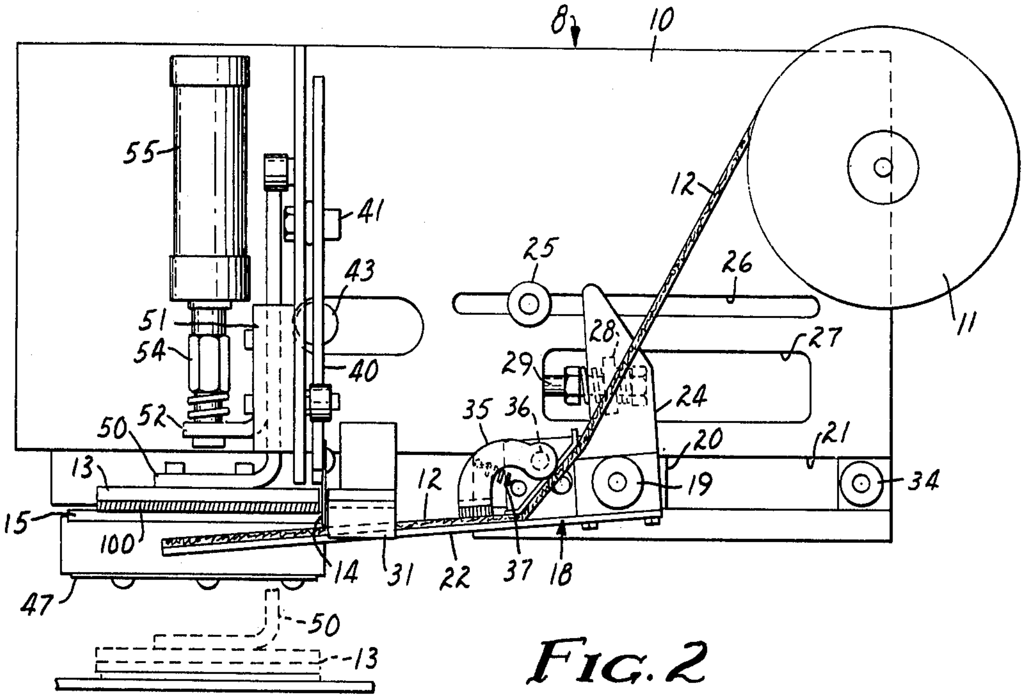
FIG. 2 is a fragmentary elevational view of the applicator of FIG. 1.
Figure 3:
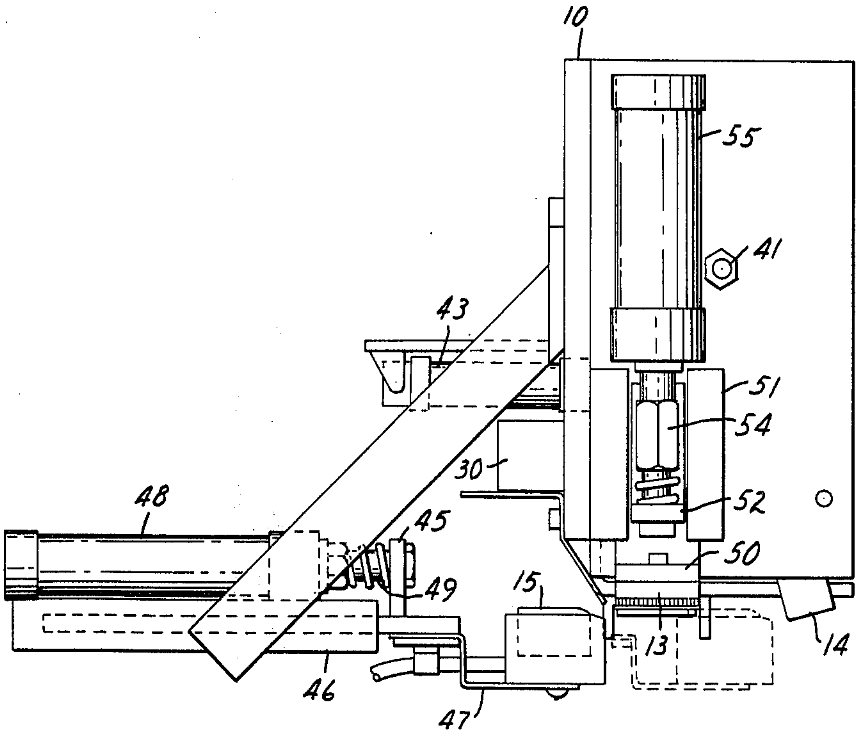
FIG. 3 is an end view of the applicator of FIG. 1.

Referring now to the drawing and to the applicator disclosed in FIGS. 1–3, generally designated 8, is adapted for feeding predetermined lengths of tape material, supporting a predetermined length of material, severing the length of material from the supply, activating the adhesive on the tape material, and applying the tape material to a receptor surface. A specific construction of tape material to be applied by the illustrated machine is described in U.S. Letters Pat. No. 3,009,235, issued to G. Mestral, on November 21, 1961. This tape material comprises a backing on one side of which is a fibrous surface and the backing and fibers are not of a heat-resistant material. Applied to the opposite surface of the backing is a layer of a flexible heat-activatable adhesive composition. The heat-activatable composition may be a polyester copolymer such as "Eastobond" FA 1 sold by Eastman Chemical Products, Inc., P.O. Box 431, Kingsport, Tennessee 37662, U.S.A.

The applicator 8 comprises a frame including a generally planar plate 10 upon which is rotatably supported a drum 11 for supporting a convolutely wound roll of the tape material 12. Feeding means are provided for advancing predetermined lengths of the tape material from the supply along a guide plate, past a cutting device and into contact with an applicating pad 13 having wire bristles to support the tape material as will be described in detail hereinafter. The feeding means is then retracted to place tension in the tape material 12. The tape material 12 is cut by a reciprocating cutting knife 14. Heating means is then moved relative to the pad and in contact with the adhesive coated face of the tape to activate the adhesive and the applicating pad 13 is moved into contact with the receiving article. The heating means comprises a high temperature bar 15.

The feeding means for the tape comprises a reciprocating frame 18 which is journalled on a pin 19 to a slide 20 which reciprocates in a slot 21 in the plate 10. The frame 18 includes a platen 22 which supports a length of tape 12 on its upper surface and an upright arm 24 which has its upper surface positioned to engage an adjustable stop 25 mounted in a slot 26. Intermediate the ends of the arm 24 and projecting through a slot 27 in the plate 10 is an ear 28 through which extends an end of a reciprocating operating rod 29 of an air motor, including a cylinder 30. The rod 29 has stops on each side of the ear 28 and reciprocates the frame 18 along the slot 21. As the connecting rod 29 moves into the cylinder 30 the frame 18 is caused to rotate around the pin 19 and moves the platen 22 through the spaced depending arms of a guide member 31 and past the cutting knife 14. When the arm 24 strikes the stop 25 the predetermined amount of tape has been advanced from the roll and the frame 18 is caused to pivot in a clockwise direction as shown in FIGS. 1 and 2, forcing the upper fibrous surface of the tape 12 into contact with the applicating pad 13. The piston of the motor then returns the connecting rod 29 and maintains the tape against the surface of the pad 13 and moves the frame 18 under the tape 12 until the slide 20 hits a stop 34 positioned at the end of the slot 21. As the frame 18 is moved an arm 35, which is biased into engagement with the tape, holds the tape to the platen to draw it from the supply and to tension the tape on the return movement. The arm 35 is pivotally mounted to the frame 18 by a pin 36 and is biased by a spring 37 into engagment with the tape 12. Fixed on the lower end of the arm 35 is a fibrous pad which engages the fibrous surface of the tape 12 as the frame 18 is moved to avoid relative movement between the tape and platen in one direction and to apply tension in the other.

Upon the return of the frame 18 the cutter 14 is caused to move transversely through the tensioned tape to sever the section of tape applied to the pad 13 from the remainder of the supply roll. The knife 14 is supported on an arm 40 which is pivotally connected to a transversely extending frame member by a pin 41. Intermediate the knife 14 and the pivot 41 is connected the reciprocating rod 42 of a cylinder 43 which drives the knife through the tape 12, between one end of the applicating pad 13 and the guide 31. The heater bar 15 is then reciprocated beneath the length of tape 12 supported by the applicating pad 13.

The heating means for activating the adhesive material on the tape 12 comprises a high temperature bar or block 15 supported on a slide member 45 which slides relative to a support frame 46 supported on the plate 10. Supported on the frame 46 is a third cylinder 48 having a connecting rod 49 connected to the slide member 45. The support for the heater block 15 on the slide member 45 is a resilient leaf spring 47 which positions the heater block normally to interfere slightly with the plane of the applicating pad which supports the tape 12. Thus, as the cylinder 48 drives the rod 49 to move the heater block 15 across the applicating pad the heater block contacts the adhesive on the tape 12 and is urged into intimate contact with the adhesive layer by the spring 47. The heater block comprises a rectangular block of stainless steel having a longitudinally extending bore into which is fitted a heater including a conventional electrical resistance unit such as a high temperature cartridge heater manufactured by Watlow Electric Manufacturing Company of St. Louis, Mo. This heating unit is thermostatically controlled to maintain a surface temperature in a range between 480° to 550° C. and preferably between 516°-527° C. The bore for the resistance unit is slightly closer to the top surface of the unit and is positioned centrally thereof such that the hotest area runs lengthwise through the center of the heater block 15 and this heater block moves across the face of the tape and back again within one-half second to one second to activate the adhesive to a depth such that the backing for the tape 12 is not heated to a damaging temperature. The to and fro motion of the heater block 15 will spread the adhesive across the tape piece and the tape piece is totally coated afterward if it was not before.

Upon the return of the heater the applicating pad 13 is driven transversely of the path of the tape and the heater block to apply the severed strip of tape 12 to an article. The pad 13 is supported on an L-shaped slide 50 which is mounted in guide 51 and which has an ear 52 connected to the connecting rod 54 of a fourth cylinder 55. Operation of the cylinder 55 drives the connecting rod and pad 13 downwardly toward the article as illustrated in FIGS. 1, 2 and 3.

The cylinder 55 then holds the pad 13 against the article such that the bristles in the pad will force the adhesive surface of the tape into intimate contact with the article. The pad 13 will maintain the tape and the article under pressure for a predetermined time period sufficient for the adhesive to cool and develop a bond with the article so that the fibrous surface of the tape will pull free from the applicating pad 13.

The air motors including cylinders 30, 43, 48, and 55 are small bore motors operated through suitable valves to sequence the operation of the machine. The speed of the cylinder 48 is controlled through the use of a speed control muffler such as those made by Mosier Industries, Inc. of Dayton, Ohio, and identified as part #SCM-1.

The applicator 8 can also be used to apply pressure-sensitive adhesive coated fibrous tape material which is supplied in a roll with a release liner covering the adhesive layer. In such an instance the heater block would not be necessary but it would be necessary to peel the liner from the adhesive coated surface of the tape around the end of the platen. Thus, as the frame 18 is returned to the initial position against the stop 34 the tape would be held by the applicating pad 13 and the liner would be peeled from the tape and pulled along the under surface of the platen 22 by a take-up wheel or drive rollers. The tape could then be cut and the cut length applied by the applicating pad.

Figure 4:
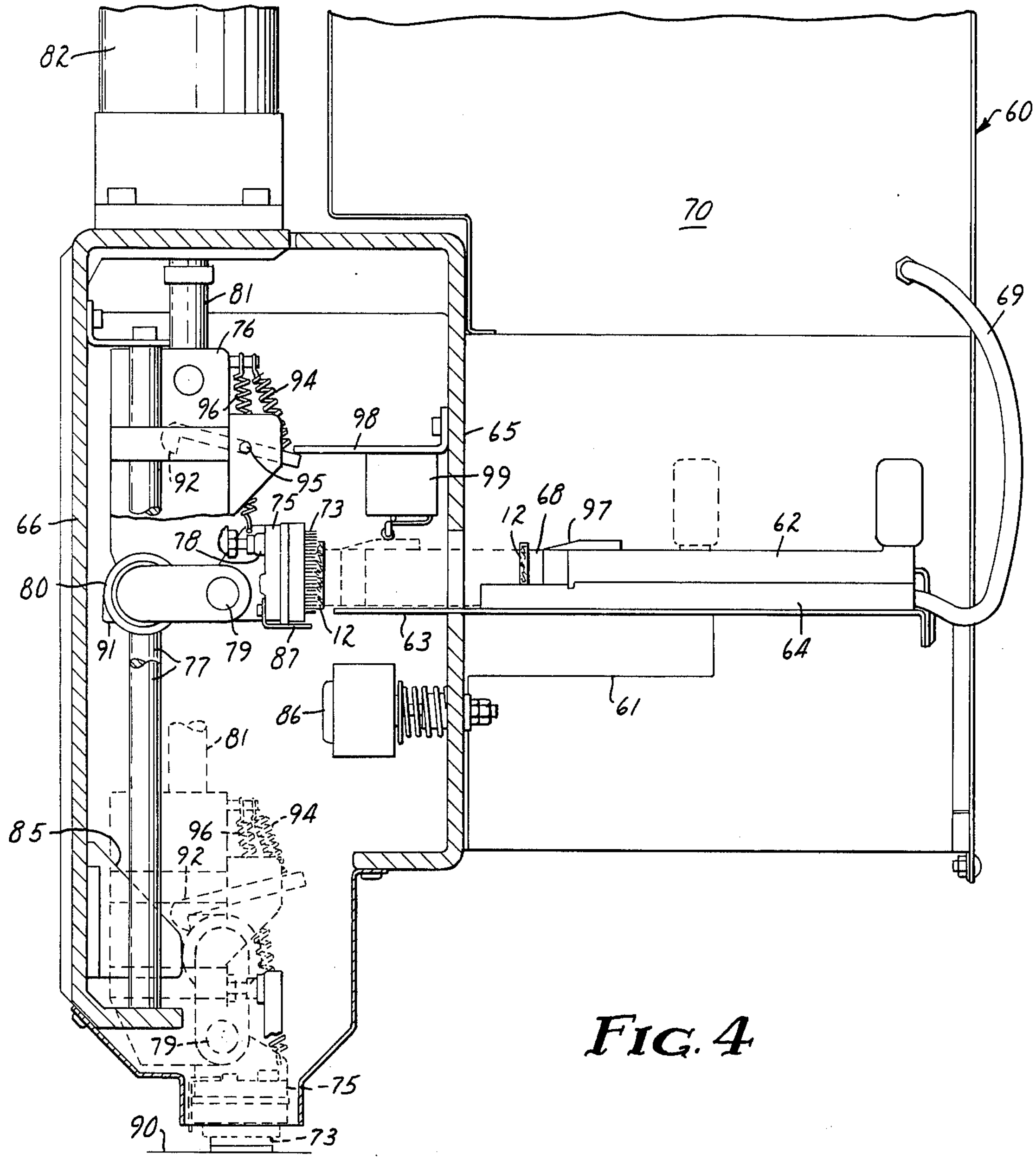
FIG. 4 is a fragmentary view of a second embodiment of an applicator constructed according to the present invention.

Referring now to the embodiment shown in FIG. 4, an applicating unit is disclosed which is similar to that disclosed in FIGS. 1-3 for heat activatable tapes, but the feeding of the tape and the relative movement of the members is changed to illustrate a second embodiment of the invention. In this device, generally illustrated by reference numeral 60, a frame member 61 supports a slide 62 via a guide member 64 for movement into and out of an enclosed chamber formed by members 65, 66 and other frame members which are not shown. The guide member 64 has a lower plate 63 and transversely spaced side bars. The slide 62 has an internal passageway leading to a perforated plate 68 defining a platen on the face thereof and the passageway is connected by means of a flexible conduit 69 to a chamber 70 wherein the air is at a pressure lower than atmosphere. This construction then places a slight vacuum on the face of the plate 68. Precut lengths of tape material 12 may be placed on the plate 63 and against the palte 68 with the adhesive surface of the tape against the plate 68. The tape will be held on the plate 68 by the fact the tape covers the openings in the plate 68. The slide 62 is reciprocated by hand or by a drive rod from a cylinder to move the slide 62 along the guide 64 and move the plate 68 and the tape 12 into the chamber through an opening in the frame member 65. The slide 62 is moved sufficiently that the tape 12 is forced into contact with the bristles on an applicating pad 73 supported on a pivoted head 75. The head 75 is supported on a reciprocating frame 76 slidably mounted within the chamber on two transversely spaced guide members comprising the rods 77. The head 75 is pivoted around a pin 79 and has an arm extending in a direction opposite the applicating pad 73 to which is connected a cam follower 80. The connecting rod 81 of a cylinder 82 is connected to the slide frame 76 to move the same along the rods 77. As the cylinder 82 drives the connecting rod 81 therefrom the slide frame 76 moves along the rods 77 bringing the cam follower 80 into engagement with a cam surface 85, causing the head 75 to pivot about the pin 79 through 90° to position the applicating pad 73 in a downwardly facing direction as illustrated in the drawing in broken lines.

As the cylinder 82 moves the applicating pad 73 downwardly the heat-activatable adhesive surface of the tape 12 is moved past a spring-supported heater block 86 supported by the frame member 65 and positioned upwardly from the cam 85 such that the position of the head 75 was not changed until after the tape surface was moved past the hot face of the heater 86. This heater block 86 is constructed much the same as the aforedescribed heater block 15.

A shield 87 is supported on the head 75 to shield the applicating pad 73 from heat radiating from the heater block 86 during the times the head 75 is positioned for the pad 73 to receive the strips of tape 12 from the slide 62.

As illustrated in the dotted line position of the head 75, as the slide frame 76 moves downwardly, the cam follower 80 is brought into engagement with the cam surface 85. This causes the head 75 to pivot 90° on pin 79 positioning the applicating pad 73 and the tape for contact with an article 90 to which the tape is to be applied. At this time a shoulder 91 on the head 75 is moved to engage a catch 92 which is biased by a spring 94 about a pin 95 such that it will engage the shoulder 91. The catch 92 holds the head 75 in the rotated position so it returns upwardly in the rotated position it occupied when it was applying the tape so the bristles of the applicating pad 73 do not contact the face of the heater block 86 on the return movement. As the head 75 reaches the uppermost position the catch 92 is released by engagement thereof with an arm 98 extending outwardly from the frame member 65 and a tension spring 96 extending between the head 75 and slide frame 76 causes the head to reposition itself as indicated in solid lines in FIG. 4. A stop 78 on the slide frame engages the head 75 to position the head 75 and pad 73.

The slide 62 has a cam 97 which will actuate the follower on a small air valve 99 which will energize the machine cycle. The valve 99 first resets a conventional air-operated timer to control the machine cycle time and when the cam 97 moves away from the valve 99 it starts the timer. The timer then energizes the air motor 82 and an operating cycle to apply the cut section of tape begins.

The applicating pads 13 and 73 are formed to have wire bristles extending from the surface thereof for penetrating and contacting the fibrous surface of the tape, and to engage the backing opposite the adhesive to press the same uniformly into engagement with the article.

Figure 5:
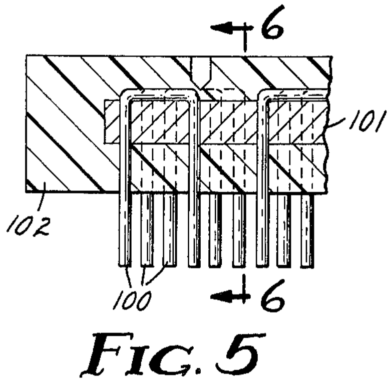
FIG. 5 is an enlarged detailed transverse sectional view of the applicating pad for use in the applicator.
Figure 6:
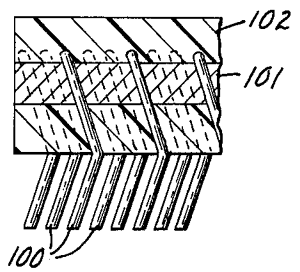
FIG. 6 is a sectional view taken along line 6—6 of FIG. 5.

As illustrated in the enlarged detail view, FIGS. 5 and 6, the applicating pad comprises a plurality of staples 100, preferably formed of high tensile steel wire, which penetrate one or more layers of a fabric backing 101. The staples 100 extend through the fabric backing 101 to form a brush like surface having a density of wire bristles on the order of between 25 and 64 bristles per square centimeter. The wire may have a diameter of between 0.46mm and 0.41mm, and in viewing the pad from an end the bristles appear to extend from the face of the pad normal to the surface thereof, and in viewing the pad from the side, the bristles extend from the pad at an angle of about 15', as shown in FIG. 6. The free ends of the staples 100 are ground obliquely to their axis to form a planar surface. The ground ends of the staples then have a small point or burr resulting from the grinding operation and they tend to firmly contact the fibrous surface of the tape to hold the same as the tape is moved across the heater block and to penetrate the fibers sufficiently to engage the backing to force the same into contact with the article such that the adhesive surface is firmly, uniformly and evenly placed in engagement therewith. The backing 101 and staples 100 are cast in a block of an acrylic polyester resin such as a clear casting compound CL-AP, sold by the Castolite Company, Woodstock, Illinois 60098, U.S.A., under the tradename "Castolite." The cast bristle pad has sufficient integrity that the pad can apply a pressure of about 7.03 kilograms per square centimeter at the bond interface.

Having thus described the present invention with respect to the preferred embodiments, it will be appreciated that other modifications may be made without departing from the spirit or the scope of this invention as defined by the appended claims.

What is claimed is:

1. A tape applicator for applying a length of material coated with a heat-activatable adhesive to a receptor surface, said applicator comprising movable support pad means for supporting a length of said material, means for moving said pad means from a first receiving position to a second applying position to apply said length of material to the receptor surface, heater block means for making wiping contact with the adhesive-coated surface of said length of material supported on said pad means for activating said adhesive before the length of material is placed into contact with said receptor surface, said heater block means comprising a bar of metal having a longitudinal axis and having a bore disposed parallel with said axis, a heating unit disposed within said bore which is thermostatically controlled to maintain a high surface temperature on said bar of metal, and spring means supporting said bar of metal for urging the same toward said pad means during wiping contact between said block means and the adhesive of a length of material on said pad means to afford intimate contact between said bar of metal and said adhesive.

* * * * *